United States Patent
Filippi et al.

(10) Patent No.: US 11,316,882 B2
(45) Date of Patent: *Apr. 26, 2022

(54) USER CONFIGURABLE ALERT NOTIFICATIONS APPLICABLE TO SEARCH QUERY RESULTS

(71) Applicant: Splunk Inc., San Francisco, CA (US)

(72) Inventors: Nicholas J. Filippi, Atherton, CA (US); Siegfried Puchbauer-Schnabel, San Francisco, CA (US); Carl S. Yestrau, San Francisco, CA (US); Vivian Shen, San Francisco, CA (US); J. Mathew Elting, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/944,127

(22) Filed: Jul. 30, 2020

(65) Prior Publication Data
US 2021/0037036 A1    Feb. 4, 2021

Related U.S. Application Data

(63) Continuation of application No. 16/177,394, filed on Oct. 31, 2018, now Pat. No. 10,778,710, which is a
(Continued)

(51) Int. Cl.
*H04L 29/06*    (2006.01)
*G06F 9/54*    (2006.01)
(Continued)

(52) U.S. Cl.
CPC .......... *H04L 63/1425* (2013.01); *G06F 9/542* (2013.01); *G06F 16/21* (2019.01);
(Continued)

(58) Field of Classification Search
CPC .................................................. H04L 63/1425
See application file for complete search history.

(56) References Cited

U.S. PATENT DOCUMENTS

| 8,042,178 B1 | 10/2011 | Fisher et al. |
| 8,496,180 B2 | 7/2013 | Bahr et al. |

(Continued)

*Primary Examiner* — William S Powers
(74) *Attorney, Agent, or Firm* — Shook, Hardy & Bacon L.L.P.

(57) ABSTRACT

The disclosed embodiments relate to a system that generates an alert based on information extracted from search results generated by a query. During operation, the system executes the query to generate the search results. The system also obtains configuration information for the alert, wherein the configuration information identifies information associated with the search results, and also specifies a trigger condition for the alert. Next, when the trigger condition for the alert is met, the system uses the configuration information to generate a payload containing the identified information associated with the search results. The system then invokes alert-generating functionality and provides the payload as input to the alert-generating functionality. This enables the alert-generating functionality to use the information from the search results while performing one or more alert actions association with the alert.

20 Claims, 17 Drawing Sheets

Related U.S. Application Data continuation of application No. 15/499,852, filed on Apr. 27, 2017, now Pat. No. 10,164,994, which is a continuation of application No. 14/698,724, filed on Apr. 28, 2015, now Pat. No. 9,667,640.

(51) Int. Cl.

| | | |
|---|---|---|
| *G06F 16/21* | (2019.01) | |
| *G06F 16/33* | (2019.01) | |
| *G06F 16/903* | (2019.01) | |
| *H04L 67/02* | (2022.01) | |
| *H04L 41/0686* | (2022.01) | |
| *H04L 51/23* | (2022.01) | |
| *H04L 41/22* | (2022.01) | |
| *H04L 65/65* | (2022.01) | |

(52) U.S. Cl.
CPC .... *G06F 16/3331* (2019.01); *G06F 16/90344* (2019.01); *H04L 41/0686* (2013.01); *H04L 51/30* (2013.01); *H04L 67/02* (2013.01); *H04L 41/22* (2013.01); *H04L 65/608* (2013.01)

(56) References Cited

U.S. PATENT DOCUMENTS

| | | | |
|---|---|---|---|
| 2003/0046639 A1 | 3/2003 | Fai et al. | |
| 2004/0158455 A1* | 8/2004 | Spivack | G06F 16/36 |
| | | | 704/9 |
| 2009/0128504 A1* | 5/2009 | Smith | G06F 3/04883 |
| | | | 345/173 |
| 2009/0319544 A1 | 12/2009 | Griffin et al. | |
| 2010/0306249 A1* | 12/2010 | Hill | G06Q 50/01 |
| | | | 707/769 |
| 2012/0109924 A1 | 5/2012 | Jones et al. | |
| 2013/0024446 A1 | 1/2013 | Jones et al. | |
| 2016/0098402 A1* | 4/2016 | Filippi | G06F 11/0751 |
| | | | 707/722 |
| 2016/0147830 A1* | 5/2016 | Zhong | G06F 16/125 |
| | | | 707/769 |

\* cited by examiner

Original Search: 501
search "error | stats count BY host

Sent to peers: 502
search "error | prestats count BY host (map)

Executed by search head: 503
Merge prestats results received from peers (reduce)

```
<alert>
    <server_host>localhost:8089</server_host>
    <server_uri>https://localhost:8089</server_uri>
    <session_key>1234512345</session_key>

/opt/splunk/var/run/splunk/12938718293123.
121/results.csv.gz http://splunk.server.local:8000/en-US/app/
search?sid=12341234.123
    <sid>12341234.123</sid>
    <search_name>My Saved Search</search_name>
 <owner>admin</owner>
 <app>search</app>
    <configuration>
        <stanza name="My Saved Search">
            <param name="some_param">some value</param>
            <param name="other_param">other
value</param>
        </stanza>
    </configuration>
</alert>
```

FIG. 8A

```
{
 "server_host": "localhost:8089",
 "server_uri": "https://localhost:8089",
 "session_key": "1234512345",
 "results_file":
"/opt/splunk/var/run/splunk/12938718293123.121/results.c
sv.gz",
 "results_link":
"http://splunk.server.local:8000/en-US/app/search?sid=12
341234.123",
 "sid": "12341234.123",
 "search_name": "My Saved Search",
 "owner": "admin",
 "app": "search",
 "configuration": {
  "some_param": "some value",
  "other_param: "other value"
 }
}
```

USER CONFIGURABLE ALERT NOTIFICATIONS APPLICABLE TO SEARCH QUERY RESULTS

RELATED APPLICATION

This application claims benefit as a Continuation of U.S. application Ser. No. 16/177,394, filed Oct. 31, 2018 which is a Continuation of U.S. application Ser. No. 15/499,852, filed Apr. 27, 2017, now U.S. Pat. No. 10,164,994, issued Dec. 25, 2018, which is a Continuation of U.S. application Ser. No. 14/698,724, filed Apr. 28, 2015, now U.S. Pat. No. 9,667,640, issued May 30, 2017, the entire contents of the foregoing are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

BACKGROUND

Field of the Invention

The disclosed embodiments generally relate to query-processing systems. More specifically, the disclosed embodiments relate to a query-processing system that facilitates generating alerts based on search results produced by the query-processing system.

Related Art

Modern data centers often comprise thousands of host computer systems that operate collectively to service requests from even larger numbers of remote clients. During operation, these data centers generate significant volumes of performance data and diagnostic information that need to be analyzed to diagnose performance and security problems. To monitor such large volumes of data, organizations often use event-based systems, such as the SPLUNK® ENTERPRISE system produced by Splunk Inc. of San Francisco, Calif., to store and process their performance data and diagnostic information. The Splunk system can be used to process large volumes of data by using queries specified in Splunk's Search Processing Language (SPL).

The search results produced by such queries often contain important information related to performance problems and security issues, and it is often necessary to take immediate action to deal with such problems. Hence, when a performance problem or security issue is detected, it is desirable to generate an alert that triggers one or more "alert actions" to deal with such problems. For example, an alert action can include sending an email to a system administrator, or causing a firewall to block packets received from a specific IP address. At present, this can only be accomplished by manually writing a script (or application) to examine the search results and generate an alert.

Hence, what is needed is a system that facilitates automatically generating alerts based on search results generated by a query-processing system.

SUMMARY

The disclosed embodiments relate to a system that generates an alert based on information extracted from search results generated by a query. During operation, the system executes the query to generate the search results. The system also obtains configuration information for the alert, wherein the configuration information identifies information associated with the search results, and also specifies a trigger condition for the alert. Next, when the trigger condition for the alert is met, the system uses the configuration information to generate a payload containing the identified information associated with the search results. The system then invokes alert-generating functionality and provides the payload as input to the alert-generating functionality. This enables the alert-generating functionality to use the information obtained from the search results to generate the alert.

The disclosed embodiments also relate to a system that enables a user to configure alert actions based on search results generated by a query. During operation, the system presents an alert user interface (UI) to a user, wherein the alert UI enables the user to configure one or more alert actions to be performed based on the search results. Next, the system receives alert configuration information from the user through the alert UI, wherein the alert configuration information includes tokens representing parameters associated with the query and the search results. Then, while generating an alert associated with the search results, the system performs a token substitution operation that substitutes tokens in the alert configuration information with corresponding parameters from the search results to generate a payload that is communicated to alert-generating functionality. This token substitution allows the parameters to be used by the alert-generating functionality while performing the one or more alert actions.

BRIEF DESCRIPTION OF THE DRAWINGS

FIG. 5 illustrates an exemplary search query received from a client and executed by search peers in accordance with the disclosed embodiments.

FIG. 6A illustrates a search screen in accordance with the disclosed embodiments.

FIG. 6B illustrates a data summary dialog that enables a user to select various data sources in accordance with the disclosed embodiments.

FIG. 8A illustrates an exemplary XML payload in accordance with the disclosed embodiments.

FIG. 8B illustrates an exemplary JSON payload in accordance with the disclosed embodiments.

FIG. 12C presents a screenshot illustrating how an alert can be manually triggered through a UI in accordance with the disclosed embodiments.

DETAILED DESCRIPTION

Figure 1:
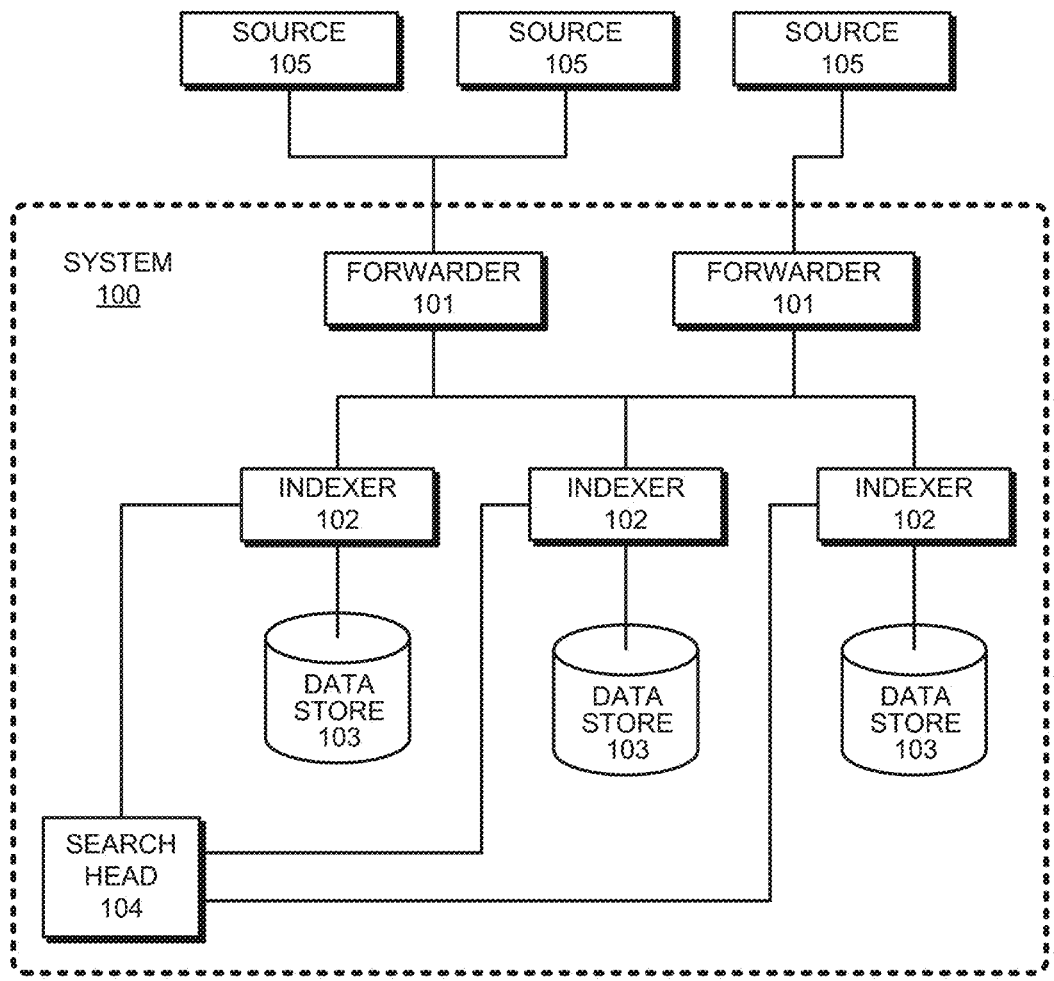
FIG. 1 presents a block diagram of an event-processing system in accordance with the disclosed embodiments.

The disclosed embodiments relate to a system that facilitates automatically generating alerts based on search results generated by a query-processing system. This system is described in more detail below, but first we describe the structure of an event-based framework in which this system operates.

1.1 System Overview

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that was selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

FIG. 1 presents a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, wherein each indexer operates on data contained in a specific data store 103. These forwarders and indexers can comprise separate computer systems in a data center, or may alternatively comprise separate processes executing on various computer systems in a data center.

During operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 1-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 2:
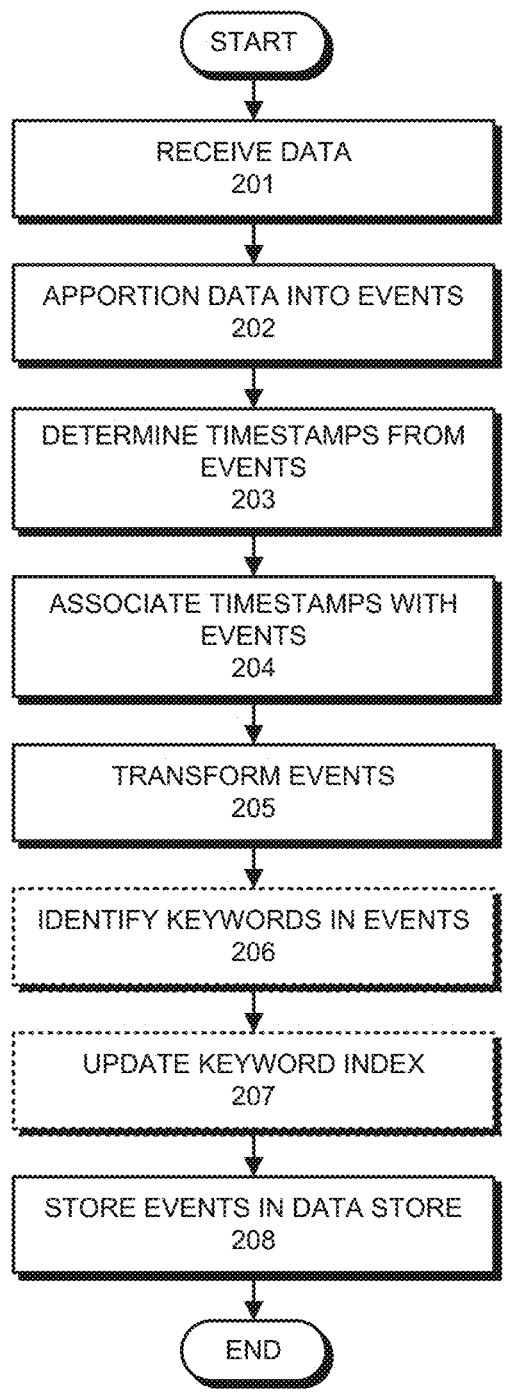
FIG. 2 presents a flow chart illustrating how indexers process, index, and store data received from forwarders in accordance with the disclosed embodiments.

FIG. 2 presents a flow chart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. patent application Ser. No. 14/266,817 also filed on 30 Apr. 2014.

1.4 Query Processing

Figure 3:
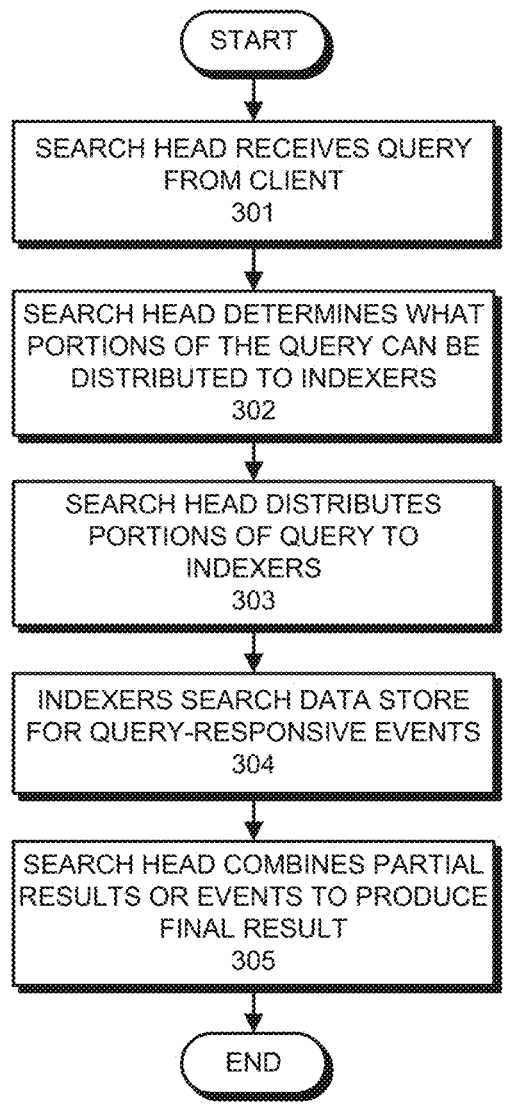
FIG. 3 presents a flow chart illustrating how a search head and indexers perform a search query in accordance with the disclosed embodiments.

FIG. 3 presents a flow chart illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 4:
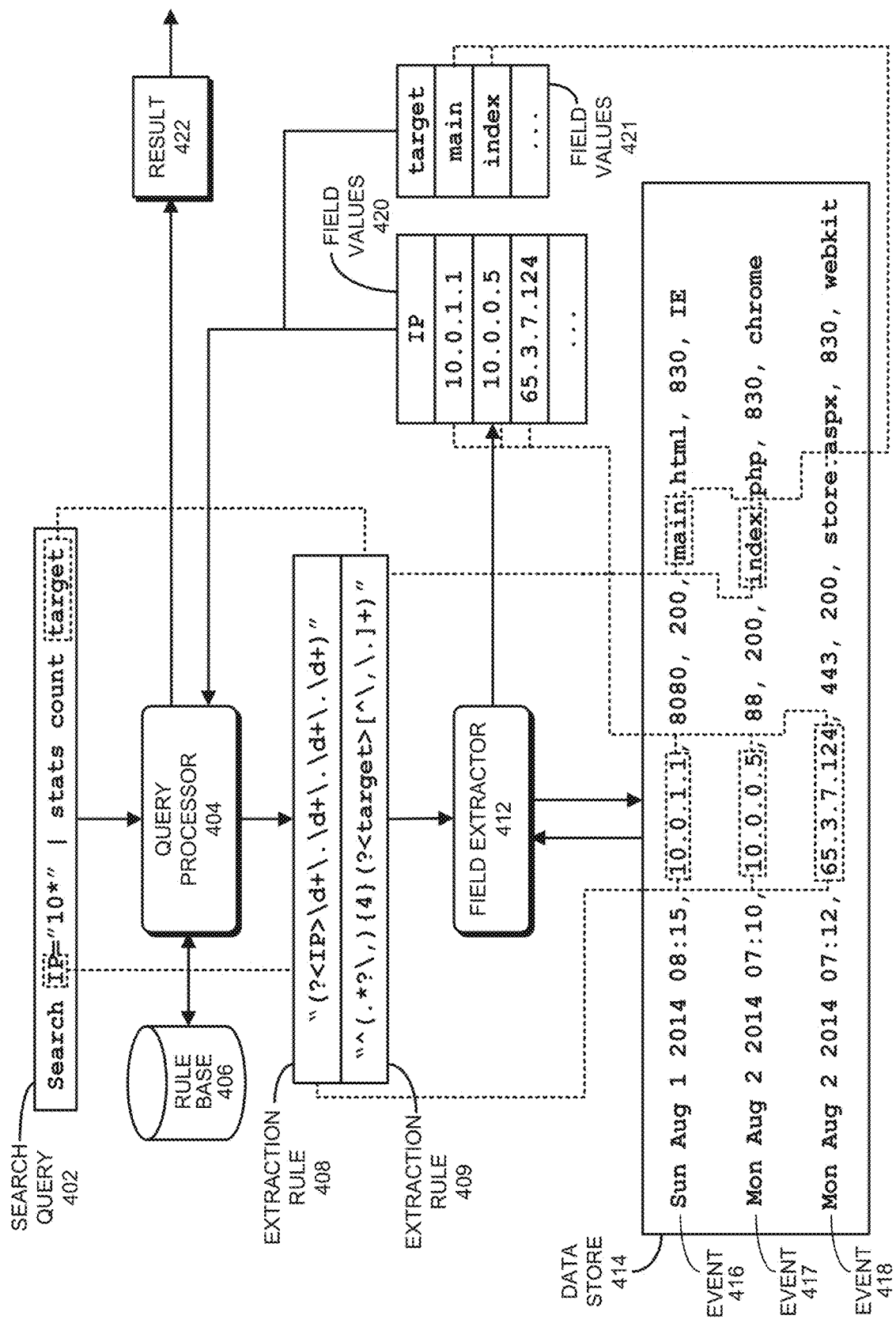
FIG. 4 presents a block diagram of a system for processing search requests that uses extraction rules for field values in accordance with the disclosed embodiments.

FIG. 4 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 4 is expressed in the Search Processing Language (SPL), which is used in conjunction with the SPLUNK® ENTERPRISE system. SPL is a pipelined search language in which a set of inputs is operated on by a first command in a command line, and then a subsequent command following the pipe symbol "I" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 4, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 4. Moreover, the query processor 404 can instruct field extractor 412 to apply the extraction rules to all the events in a data store 414, or to a subset of the events that has been filtered based on some criteria.

Next, field extractor 412 applies extraction rule 408 for the first command "Search IP="10*" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Exemplary Search Screen

Figure 6A:
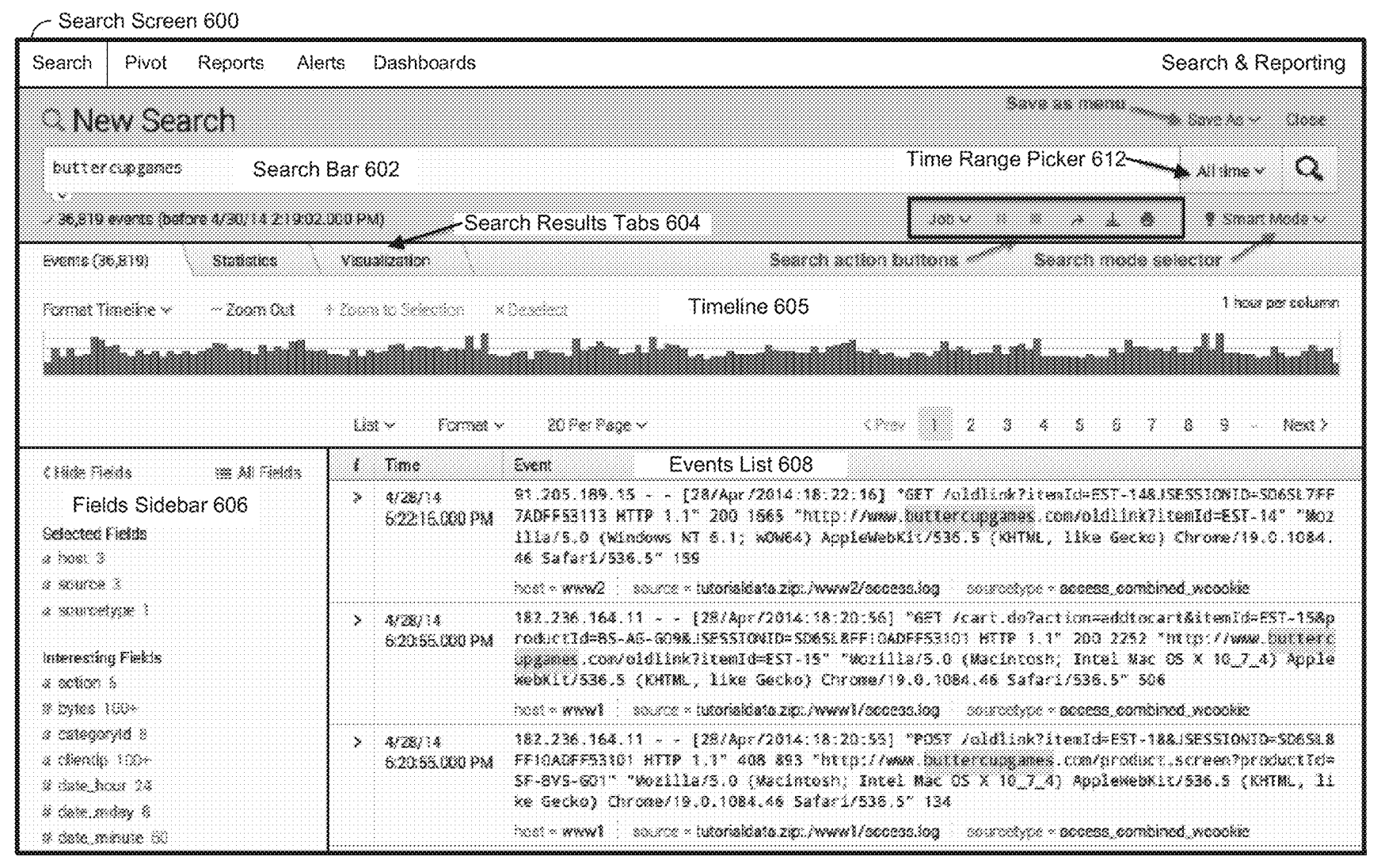
Figure 6B:
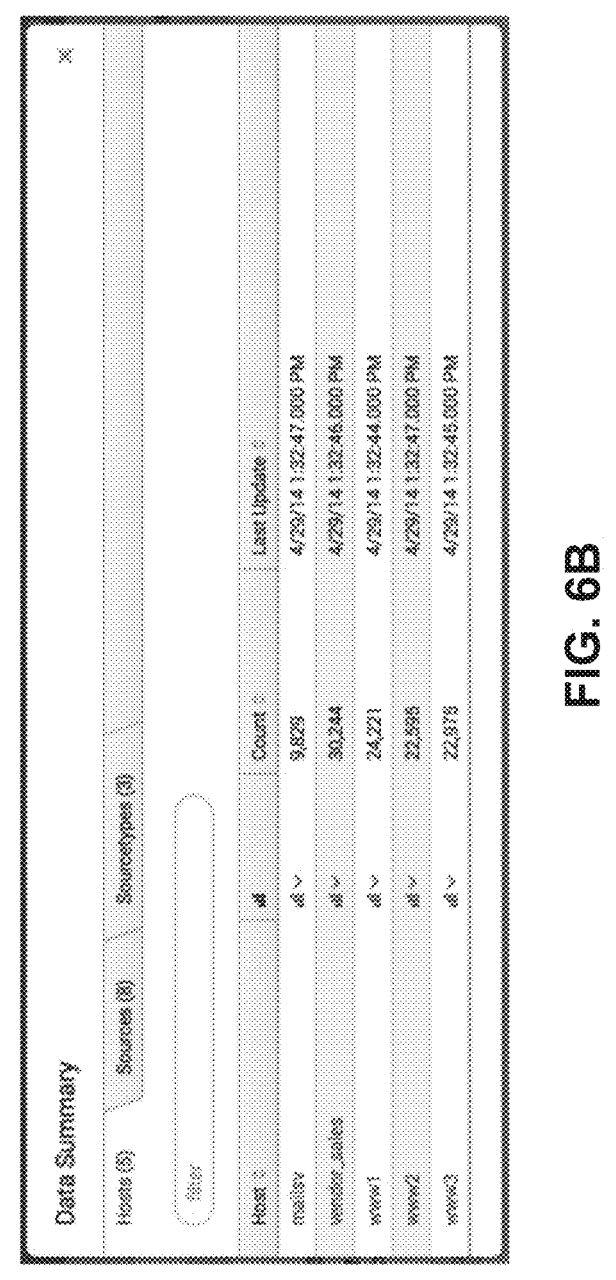

FIG. 6A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 5 illustrates how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising merging operations 503 to be executed by the search head when the results are ultimately collected from the indexers.

During operation, upon receiving search query 501, search head 104 modifies search query 501 by substituting "stats" with "prestats" to produce search query 501, and then distributes search query 501 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

1.7.2 Keyword Index

As described above with reference to the flow charts in FIGS. 2 and 3, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

System for Generating Alerts

Figure 7:
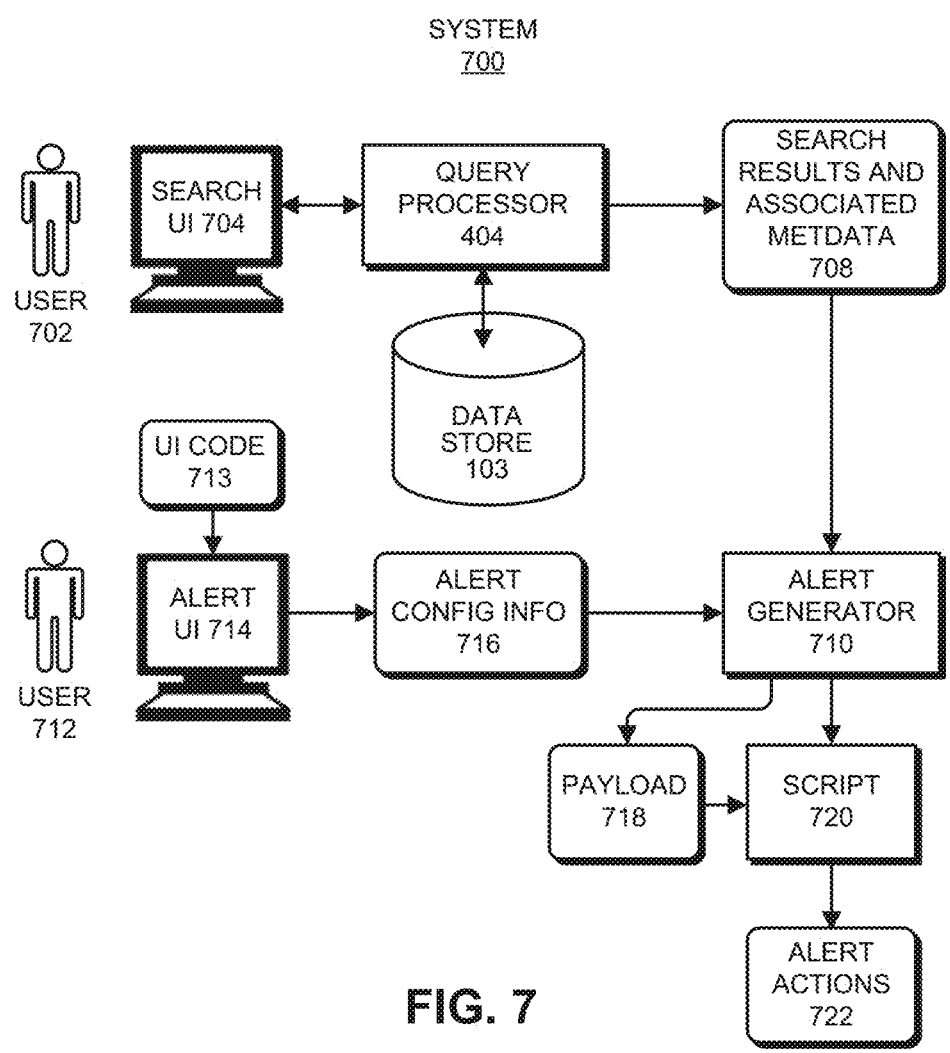
FIG. 7 illustrates a system for generating an alert based on search results in accordance with the disclosed embodiments.

FIG. 7 illustrates a system 700 for generating alerts based on search results produced by a query along with associated metadata associated in accordance with the disclosed embodiments. The system includes a query processor 404 that execute queries on behalf of a user 702 who inputs the queries through a search UI 704. These queries can operate on events obtained from data store 103 to produce search results and associated metadata 708. Note that this associated metadata can include metadata about the search itself, such as the name of the search and the running time of the search. Note that the operations performed by query processor 404 are described in more detail above with reference to FIG. 4.

Search results and associated metadata 708 feed into an alert generator 710, which can generate an alert based on the search results and associated metadata 708. This alert can be configured by a user 712 who can input various parameters for the alert through an alert UI 714. Note that user 712 and user 702 can possibly be the same user. Also note that alert UI 714 can be rendered based on UI code 713, which is received from a third-party developer who is not part of an organization that owns system 700. This enables the third-party developer to generate a custom alert UI, which is also customized to generate specific alert actions as is described in more detail below with reference to FIG. 10. During operation of the system illustrated in FIG. 7, the parameters entered by user 712 through alert UI 714 are used to generate alert configuration information 716, which feeds into alert generator 710.

Alert generator 710 uses this alert configuration information 716 to generate alerts based on search results and associated metadata 708. During this process, alert generator 710 assembles a payload 718 containing parameters for the alert and then triggers execution of a script 720 (or application) that uses the parameters in payload 718 to perform one or more alert actions 722 for each query result. This can happen in a number of ways. A query result can trigger a single alert action that sends out multiple alerts. For example, a single alert action might generate multiple ServiceNow™ tickets. Or, a query result can trigger multiple alert actions, such as separate alert actions that generate a ServiceNow™ ticket and that send a HipChat message.

In some embodiments, a "spec file" can be used to define the input parameters used by the script. Note that during development of UI code 713, the programmer can bind input parameters defined in the script to user-interface fields to enable the user to enter the input parameters.

Payloads

FIGS. 8A and 8B illustrate exemplary payloads containing parameters for alert actions in accordance with the disclosed embodiments. More specifically, FIG. 8A illustrates an exemplary payload expressed in eXtensible Markup Language (XML) format, and FIG. 8B illustrates an exemplary payload expressed in JavaScript Object Notation (JSON) format. Referring to FIG. 8B, the first few parameters "server_host": "localhost:8089", "server_url": "https:/localhost:8089", "session_key": "1234512345" provide information specifying how to communicate with a server that operates query processor 404. The following parameters specify a location where the results are stored.

"/opt/splunk/var/run/splunk/12938718293123.121/results.csv.gz",
"results_link":
"http://splunk.server.local:8000/en-US/app/search?sid=12341234.123", This provides a user with a "deep link" into the search results, which enables the user to easily look at specific details of the search results. The payload illustrated in FIG. 8B also includes parameters associated with the search that appear below.

"sid": "12341234.123",
"search_name": "My Saved Search",
"owner": "admin",
"app": "search", These parameters include the search ID, the name of the search and the owner/application associated with the search. These parameters can be used to facilitate communications with the server. Finally, the payload includes various search-related parameters, including metadata parameters associated with the search and data parameters obtained from fields in the search results as is described in more detail below.

Alert-Generation UI

Figure 9:
FIG. 9 illustrates an exemplary alert-generation user interface (UI) in accordance with the disclosed embodiments.

FIG. 9 illustrates an exemplary alert-generation user interface (UI) 900 in accordance with the disclosed embodiments. Exemplary alert-generation UI 900 enables a user to input a title 902 and a description 904 for the alert. It also enables the user to set permissions 906 for the alert. For example, as illustrated in FIG. 9, the alert may be "private" or "shared." Permissions may also be set to make an alert action available for only a specific application, or for only a specific subset of users. An alert action can also be selectively enabled and disabled. For example, an alert action may be disabled for a month for a specific group of users. The user can also specify an alert type 908 that indicates whether the alert is a real-time alert, which takes place upon occurrence of a specific event, or is a scheduled alert that runs, for example, every Monday at 6:00 AM. Alert-generation UI 900 also enables the user to specify various trigger conditions 910 for triggering an alert. For example, the alert can be triggered when the number of results is greater than a value such as five. Moreover, the alert can be triggered once for all five results to facilitate batch processing, or it can be triggered once for each result. The user can also specify one or more alert actions 912, such as sending an email or running a specific application.

Figure 10:
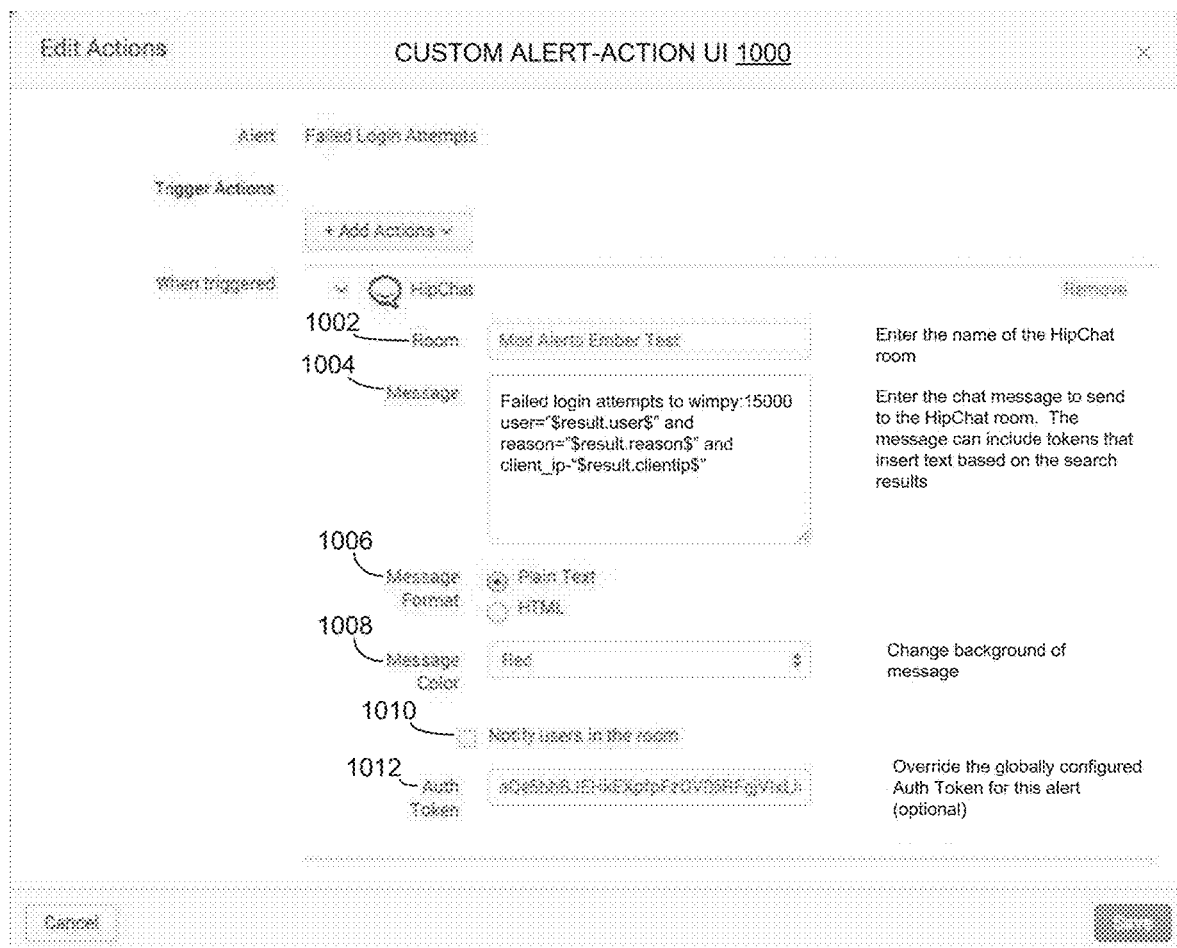
FIG. 10 illustrates an exemplary alert-action UI in accordance with the disclosed embodiments.

Note that the system also enables a user to install a custom alert-action (written by a third-party developer) into the system. For example, FIG. 10 illustrates an exemplary custom alert-action UI 1000 for the "HipChat" application in accordance with the disclosed embodiments. In this example, when the HipChat application is triggered as an alert action, it receives a number of parameters from custom alert-action UI 1000, including: (1) the name of a HipChat room 1002, (2) a chat message 1004 to be sent to the HipChat room, (3) a message format 1006 indicating whether the message is in plain text format or HTML format, (4) a message color 1008 for the message, (5) an indication 1010 of whether to notify the other users in the room, and (6) an optional authentication token 1012 that can be used to override a globally configured authentication token for the room. This custom alert-action UI 1000 can be generated by a third-party developer (who, for example, writes XML or HTML code), and this custom alert-action UI 1000 can be integrated into the alert generation system illustrated in FIG. 7.

Note that enabling the alert action to operate on pre-specified parameters associated with query result is powerful. For example, in a computer-security use-case, the chat message 1004 described above can include information identifying an IP address that is sending problematic emails. In this way, a system administrator who views the chat message can take actions to block emails from the problematic IP address. Also note that the developer creating the alert action can ask to receive specific parameters associated with the query associated search results by specifying the parameters in a "spec file" as described in more detail below.

Moreover, note that a normal user would not be expected to know what is required to invoke a specific alert action. What makes this technique powerful is that a developer, who writes the UI for configuring the alert action, can define fields for the required parameters based on the above-described "spec file." This enables the user to enter the required parameters for the alert action through the UI, without having to know what parameters are required for the alert action beforehand.

Also note that the chat message entered into the "message" field includes a number of tokens, including, "$result.user$," "$result.reason$," and "$result.clientip$." Before this message field is sent to the HipChat application, the system substitutes corresponding parameters from the search results and associated metadata in place of these tokens. In this way, the message sent to the HipChat room identifies: (1) a specific user associated with the failed login attempts, (2) a reason for the failed login attempts, and (3) the client IP address associated with the failed login attempts. Note that these parameters can be obtained from the search results and associated metadata by using a late-binding schema to extract the parameters from the search results and associated events. Also note that because the token substitutions are performed by the system prior to invoking the script, while the system is generating the payload, the script does not need to handle any of the details of the token substitution. The script developer simply defines the input parameters for the script in the spec file (as described above), and the developer for the corresponding alert-action UI incorporates fields for these input parameters into the alert-action UI.

A number of different types of parameters associated with a search can be tokenized. For example, the system can tokenize metadata about the search, such as the search name and the owner of the search. The system can also tokenize metadata about the process that executes the search, such as the time the search was executed and the running time of the search. The system can additionally tokenize metadata about the server that executed the search, such as the IP address of the server and the name of the server. Finally, the system can tokenize one or more parameters in the search results and associated metadata. This means that parameters obtained from the search results and associated metadata can be incorporated into the payload that is used to generate the alert action.

Figure 11:
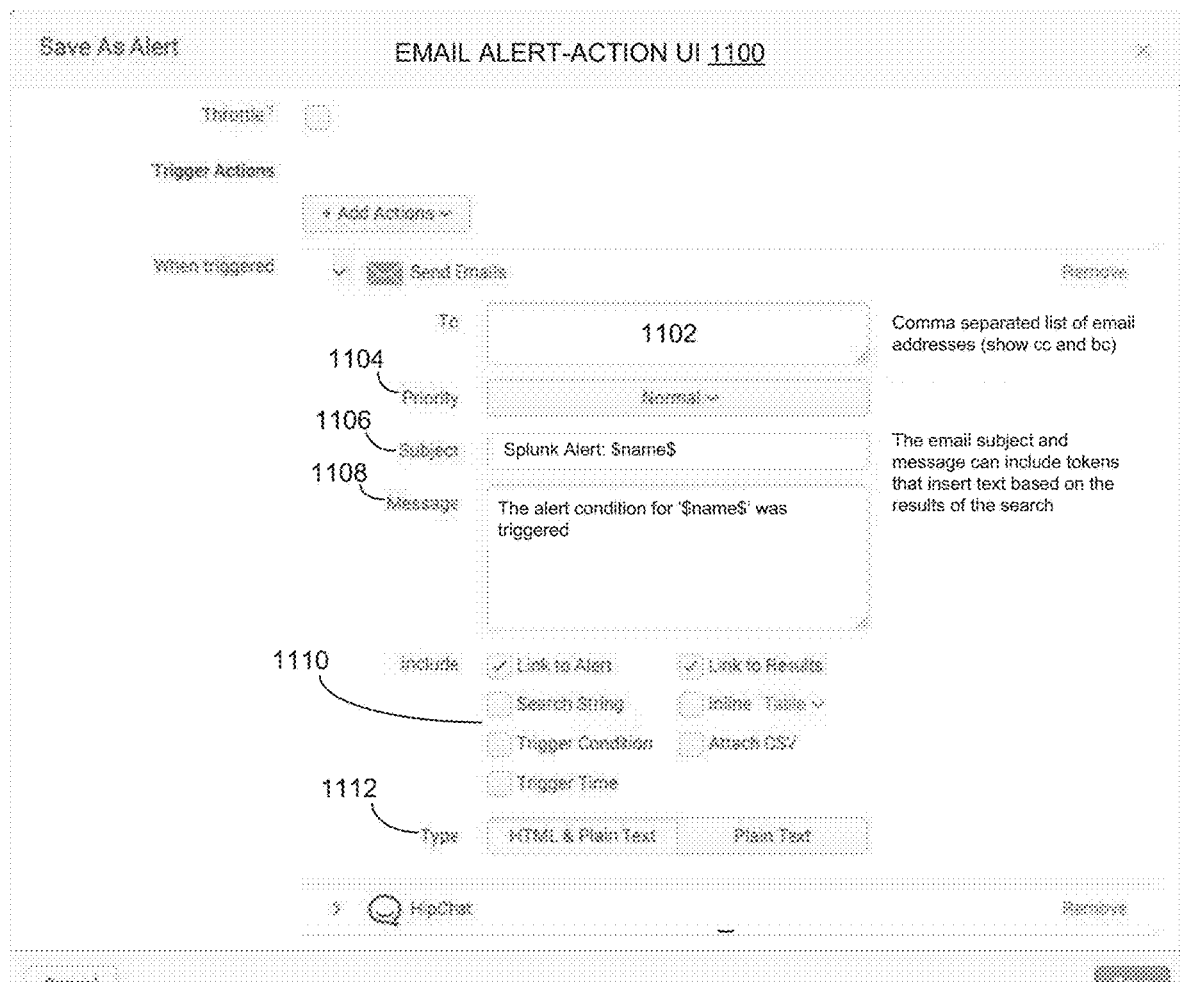
FIG. 11 illustrates an exemplary alert-action UI for emails in accordance with the disclosed embodiments.

FIG. 11 illustrates an exemplary email alert-action UI 1100 in accordance with the disclosed embodiments. Email alert-action UI 1100 enables the user to enter parameters that specify how an email is sent while processing an alert. More specifically, email alert-action UI 1100 enables the user to enter: (1) one or more email addresses in field 1102 for one or more email recipients, (2) a priority for the email 1104, (3) a subject line for the email 1106, (4) a message to be included in the body of the email 1108, (5) checkboxes 1110 for various items to include with the email, and (6) a specifier 1112 for whether the email is "HTML & Plain Text," or just "Plain Text." Unlike custom alert-action UI 1000 illustrated in FIG. 10, email alert-action UI 1100 can possibly be an "out-of-the-box" alert-action UI that comprises a standard feature of the system 700 illustrated in FIG. 7.

Also note that both the subject field and the message field of email alert-action UI 1100 include the token "$name$." Hence, before the strings in the subject field and the message field are sent to the email application, the name of the specific alert that triggered the email is substituted in place of the token "$name$." This causes the resulting email to identify the specific alert.

Process of Generating Alerts

Figure 12A:
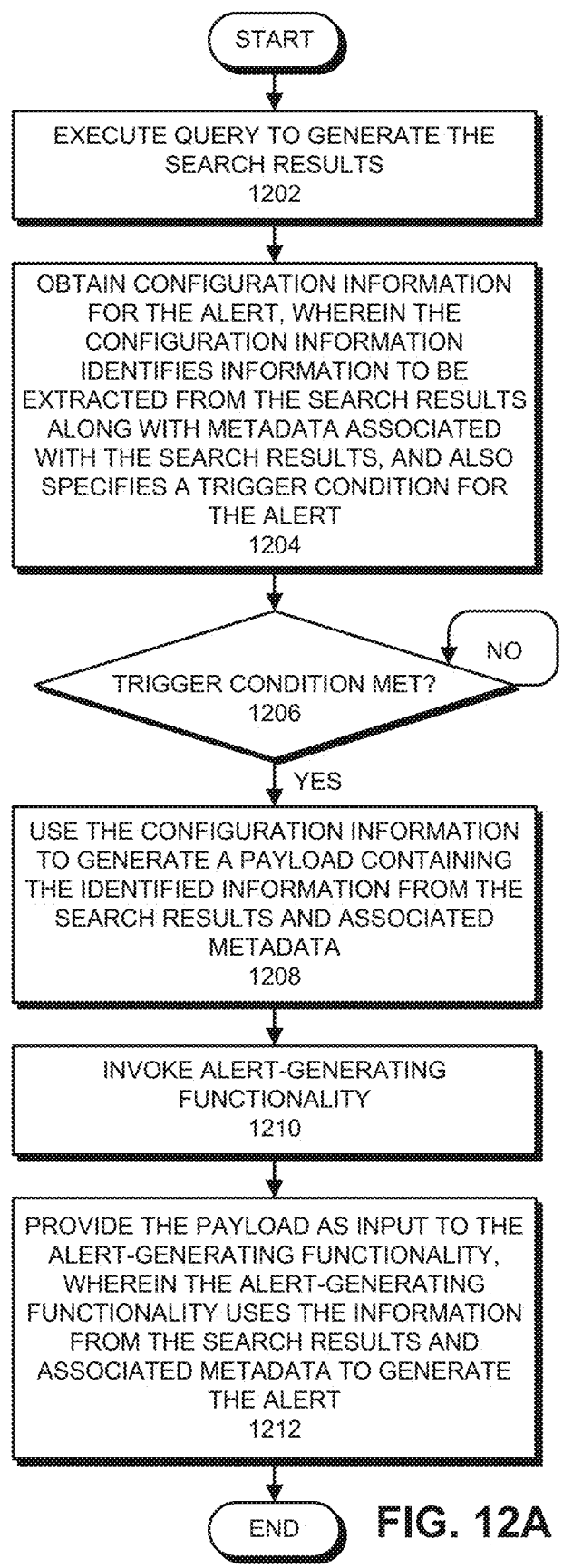
FIG. 12A presents a flow chart illustrating how alerts are generated in accordance with the disclosed embodiments.

FIG. 12A presents a flow chart illustrating how alerts are generated in accordance with the disclosed embodiments. At the start of this process, the system executes a query to generate the search results (step 1202). Next, the system obtains configuration information for the alert, wherein the configuration information identifies information to be extracted from the search results along with metadata associated with the search results, and also specifies a trigger condition for the alert (step 1204).

Then, the system monitors the trigger condition for the alert to determine when the trigger condition is met (step 1206). Finally, when the trigger condition for the alert is met, the system performs a number of operations. First, the system uses the configuration information to generate a payload containing the identified information from the search results and associated metadata (step 1208). Next, the system invokes the alert-generating functionality (step 1210). For example, the system can spawn a process that executes a script containing the alert-generating functionality. Finally, the system provides the payload as input to the alert-generating functionality, which enables the alert-generating functionality to use the information from the search results and associated metadata while generating the alert (step 1212).

Ad Hoc Alerts

Figure 12B:
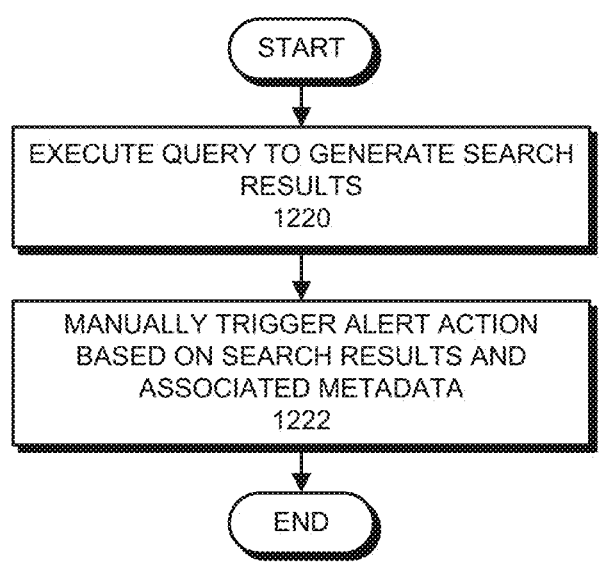
FIG. 12B presents a flow chart illustrating how an alert can be manually triggered in accordance with the disclosed embodiments.
Figure 12C:
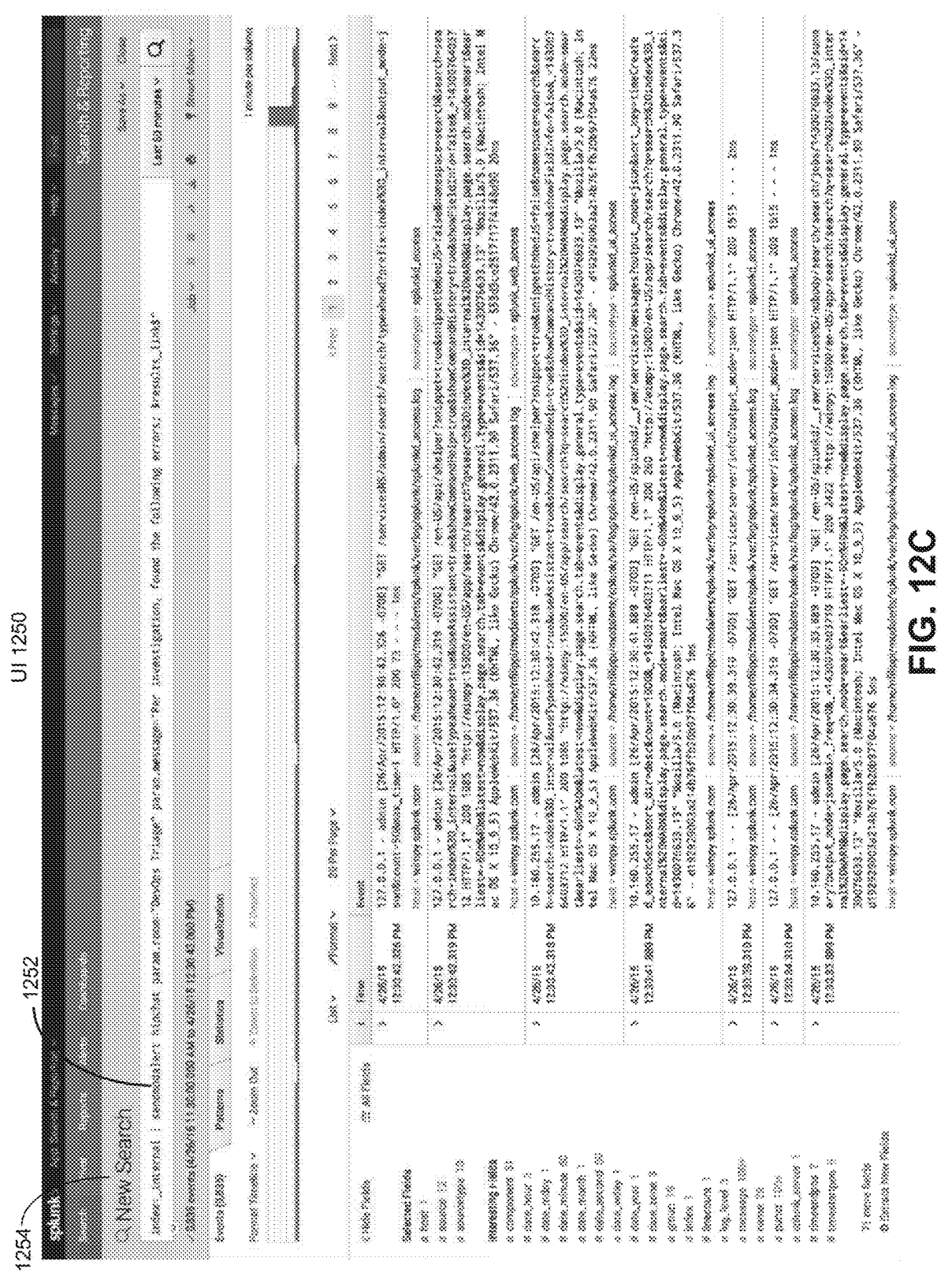

Some embodiments of the present invention also provide support for "ad hoc alerts" that can be manually triggered for a specific result set (in contrast to conventional alerts that are automatically triggered based on pre-specified trigger conditions). For example, referring the FIG. 12B, a user can execute a query to generate search results and associated metadata (step 112), and can then manually trigger an alert based on the search results and associated metadata (step 1220). For example, FIG. 12C presents a screenshot of a UI 1250 illustrating how an alert action can be manually triggered by entering the text string "I sendmodalert" 1252 into the new search bar 1254.

Figure 12D:
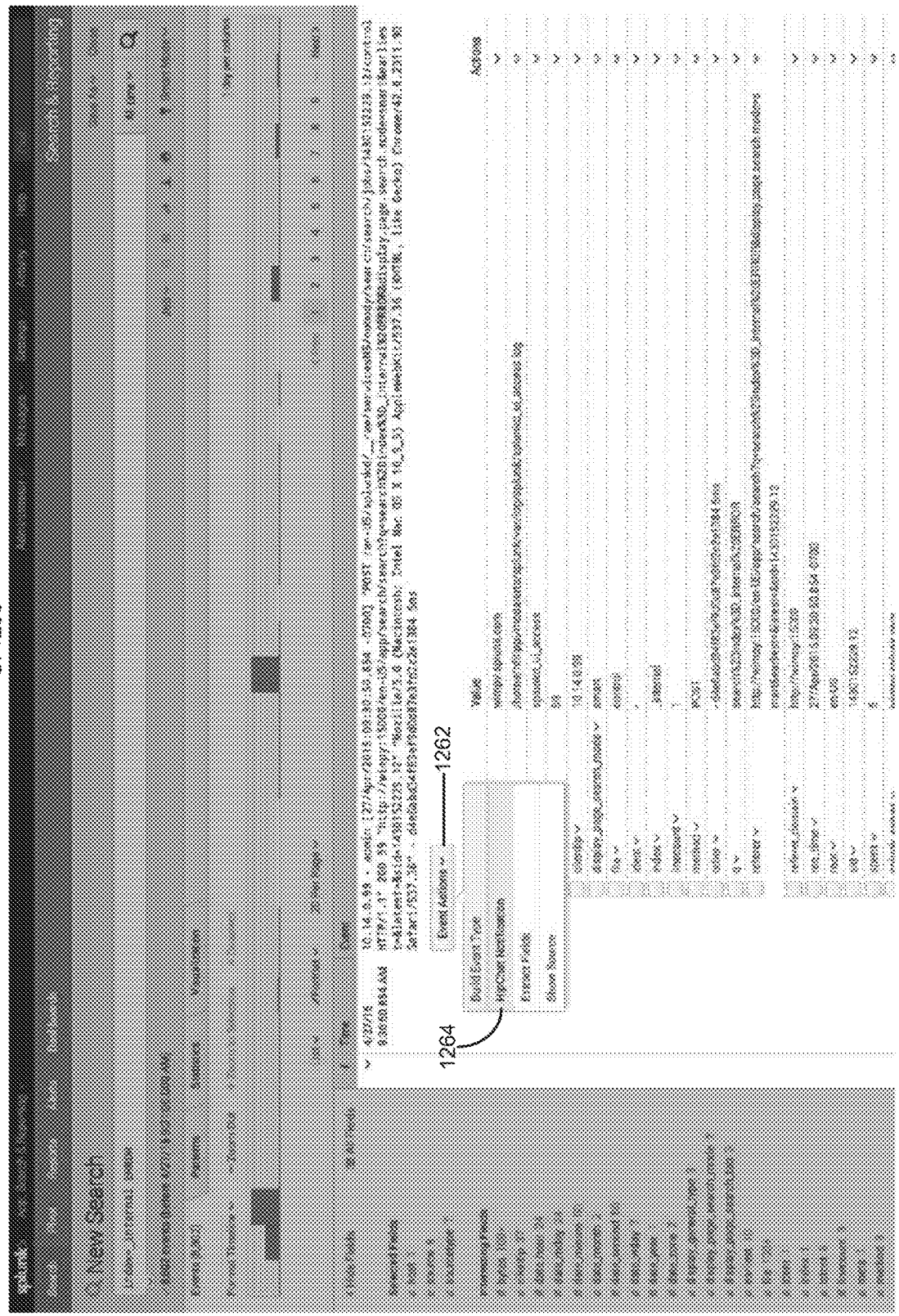
FIG. 12D presents a screenshot illustrating another technique for manually triggering an alert through a UI in accordance with the disclosed embodiments.

FIG. 12D presents another example illustrating how an alert action can be manually triggered through a UI 1260. In this example, a user who is viewing UI 1260, which is associated with a specific event, can activate a pull-down menu 1262 that contains a list of possible event actions. One of these event actions is an "alert action" that sends a HipChat notification 1264. (Recall that this HipChat alert action was previously discussed with reference to UI 1000 illustrated in FIG. 10.) By selecting this HipChat notification 1264 from pull-down menu 1262, the user can manually trigger the HipChat notification 1264 for the specific event. Note that this Hipchat notification 1264 was previously configured by the user through UI 1000, so the user does not have configure it again; the user simply triggers this pre-configured alert action. In an alternative embodiment, if the alert action that was selected to be manually triggered has not been pre-configured yet, or needs to be reconfigured, the user can be presented with a UI 1000 that enables the user to configure or reconfigure the alert action.

The above-described ad hoc alert functionality enables a user or an administrator to manually invoke an alert action "on demand" for testing purposes or other purposes. For example, in a computer-security use case, when a network administrator determines that packets received from a specific IP address are problematic, the network administrator can manually trigger an alert action that modifies a firewall rule, and while doing so, can pass the problematic IP address as a parameter to the alert action. This enables the firewall to block the problematic IP address.

Another type of ad hoc alert is an "event-generated alert" that is not necessarily associated with search results generated by a query. For example, a user may be viewing a collection of events on a screen, and may expand a drop-down on one of the events that offers options for operations that can be performed on the event. One of these operations can comprise an alert action to be applied to the event, such as generating a ServiceNow™ ticket for the event.

Process of Configuring an Alert Action

Figure 13:
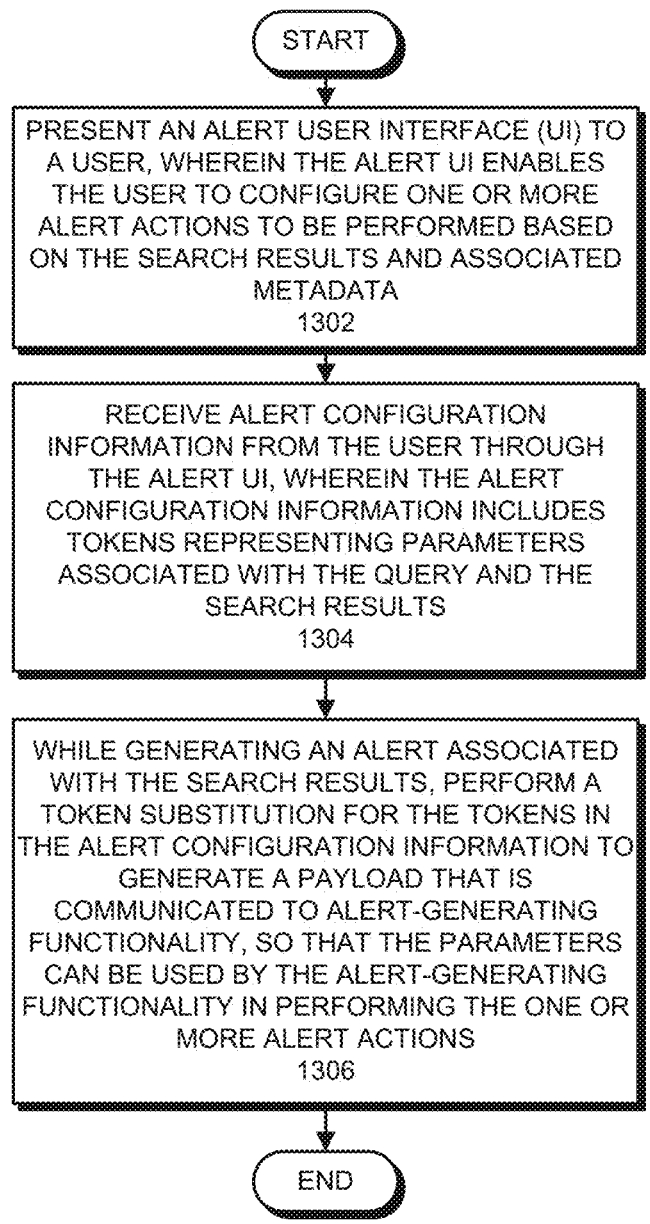
FIG. 13 presents a flow chart illustrating how a user configures an alert action in accordance with the disclosed embodiments.

FIG. 13 presents a flow chart illustrating how a user configures an alert action in accordance with the disclosed embodiments. At the start of this process, the system presents an alert user interface (UI) to a user, wherein the alert UI enables the user to configure one or more alert actions to be performed based on the search results and associated metadata (step 1302). Next, the system receives alert configuration information from the user through the alert UI, wherein the alert configuration information includes tokens representing parameters associated with the query and the search results (step 1304). Finally, while generating an alert associated with the search results, the system performs a token substitution for the tokens in the alert configuration information to generate a payload that is communicated to alert-generating functionality, so that the parameters can be used by the alert-generating functionality while performing the one or more alert actions (step 1306).

The preceding description was presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein. Accordingly, many modifications and variations will be apparent to practitioners skilled in the art. Additionally, the above disclosure is not intended to limit the present description. The scope of the present description is defined by the appended claims.

The data structures and code described in this detailed description are typically stored on a computer-readable storage medium, which may be any device or medium that can store code and/or data for use by a system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a system reads and executes the code and/or data stored on the non-transitory computer-readable storage medium, the system performs the methods and processes embodied as data structures and code and stored within the non-transitory computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

What is claimed is:

1. A method, comprising:
    querying a plurality of events derived from raw data to generate a search result;
    causing display, within an alert user interface (UI), of an event of the plurality of events included in the search result;
    receiving, based at least in part on one or more inputs to the alert UI, a request to execute an alert action for the event;
    determining configuration information corresponding to the alert action;
    based at least in part on the configuration information and the request, generating a payload including one or more values determined based at least in part on information associated with the event; and
    causing execution of the alert action based at least in part on the payload.

2. The method of claim 1, wherein the configuration information indicates one or more substitution token locations, and the generating the payload includes substituting at least one of the one or more values in at least one of the one or more substitution token locations.

3. The method of claim 1, wherein the determining the configuration information is based at least in part on one or more other inputs to the alert UI or an alert configuration UI different from the alert UI.

4. The method of claim 1, wherein the request to execute the alert action includes selecting the alert action from a plurality of alert actions.

5. The method of claim 1, wherein the request to execute the alert action includes a text string representative of the alert action.

6. The method of claim 1, wherein the alert action includes at least one of generating an email, instantiating a chat application, generating a notification, updating firewall information, or executing a user-defined alert action.

7. The method of claim 1, wherein the information associated with the event includes an internet protocol (IP) address, and the alert action modifies a firewall rule with respect to the IP address.

8. A system comprising:
    one or more processors;
    one or more memory devices storing instructions thereon that, when executed by the one or more processors, cause the one or more processors to execute operations comprising:
        querying a plurality of events derived from raw data to generate a search result;

causing display, within an alert user interface (UI), of an event of the plurality of events included in the search result;

receiving, based at least in part on one or more inputs to the alert UI, a request to execute an alert action for the event;

determining configuration information corresponding to the alert action;

based at least in part on the configuration information and the request, generating a payload including one or more values determined based at least in part on information associated with the event; and causing execution of the alert action based at least in part on the payload.

9. The system of claim 8, wherein the configuration information indicates one or more substitution token locations, and the generating the payload includes substituting at least one of the one or more values in at least one of the one or more substitution token locations.

10. The system of claim 8, wherein the determining the configuration information is based at least in part on one or more other inputs to the alert UI or an alert configuration UI different from the alert UI.

11. The system of claim 8, wherein the request to execute the alert action includes selecting the alert action from a plurality of alert actions.

12. The system of claim 8, wherein the request to execute the alert action includes a text string representative of the alert action.

13. The system of claim 8, wherein the alert action includes at least one of generating an email, instantiating a chat application, generating a notification, updating firewall information, or executing a user-defined alert action.

14. The system of claim 8, wherein the information associated with the event includes an internet protocol (IP) address, and the alert action modifies a firewall rule with respect to the IP address.

15. One or more non-transitory computer-storage media storing instructions that, when executed by one or more processors, cause the one or more processors to execute operations comprising:

querying a plurality of events derived from raw data to generate a search result;

causing display, within an alert user interface (UI), of an event of the plurality of events included in the search result;

receiving, based at least in part on one or more inputs to the alert UI, a request to execute an alert action for the event;

determining configuration information corresponding to the alert action;

based at least in part on the configuration information and the request, generating a payload including one or more values determined based at least in part on information associated with the event; and causing execution of the alert action based at least in part on the payload.

16. The one or more non-transitory computer-storage media of claim 15, wherein the configuration information indicates one or more substitution token locations, and the generating the payload includes substituting at least one of the one or more values in at least one of the one or more substitution token locations.

17. The one or more non-transitory computer-storage media of claim 15, wherein the determining the configuration information is based at least in part on one or more other inputs to the alert UI or an alert configuration UI different from the alert UI.

18. The one or more non-transitory computer-storage media of claim 15, wherein the request to execute the alert action includes selecting the alert action from a plurality of alert actions.

19. The one or more non-transitory computer-storage media of claim 15, wherein the request to execute the alert action includes a text string representative of the alert action.

20. The one or more non-transitory computer-storage media of claim 15, wherein the alert action includes at least one of generating an email, instantiating a chat application, generating a notification, updating firewall information, or executing a user-defined alert action.

* * * * *